(12) United States Patent
Kato et al.

(10) Patent No.: US 9,168,903 B2
(45) Date of Patent: Oct. 27, 2015

(54) VEHICLE BRAKE HYDRAULIC CONTROLLER

(71) Applicant: NISSIN KOGYO CO., LTD., Ueda, Nagano (JP)

(72) Inventors: Nobuyoshi Kato, Nagano (JP); Tomonori Hirose, Nagano (JP); Tomoaki Sekiya, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 14/306,735

(22) Filed: Jun. 17, 2014

(65) Prior Publication Data
US 2014/0379236 A1 Dec. 25, 2014

(30) Foreign Application Priority Data
Jun. 19, 2013 (JP) ................. 2013-128854

(51) Int. Cl.
*B60T 8/172* (2006.01)
*B60T 8/176* (2006.01)
(Continued)

(52) U.S. Cl.
CPC ............... *B60T 8/1769* (2013.01); *B60T 8/172* (2013.01); *B60T 8/1761* (2013.01); *B60T 8/1763* (2013.01);
(Continued)

(58) Field of Classification Search
CPC ............ B60T 8/00; B60T 8/17; B60T 8/173; B60T 8/176; B60T 8/1755; B60T 8/1761; B60T 8/1763; B60T 8/1769
USPC ................ 701/70–83, 90, 110; 303/138, 143, 303/147–151, 158, 163, 166, 170, 177, 178, 303/190
See application file for complete search history.

(56) References Cited

U.S. PATENT DOCUMENTS 4,266,833 A * 5/1981 Sato et al. ............... 303/156
4,446,522 A * 5/1984 Sato et al. ............... 701/79
(Continued)

FOREIGN PATENT DOCUMENTS

DE 19502420 7/1995
DE 102011003298 7/2012
(Continued)

OTHER PUBLICATIONS

Search Report for related DE application No. 14172942.6-756 dated Nov. 18, 2014, 8 pages.
(Continued)

*Primary Examiner* — Thomas Tarcza
*Assistant Examiner* — Tyler J Lee
(74) *Attorney, Agent, or Firm* — Andrew M. Calderon; Roberts Mlotkowski Safran & Cole, P.C.

(57) ABSTRACT

One embodiment provides a vehicle brake hydraulic controller including a wheel speed acquiring section; a wheel deceleration calculator; a vehicle velocity calculator; and a locking tendency determination section. The vehicle velocity calculator calculates a vehicle deceleration based on a temporary vehicle deceleration corresponding to an acceleration sensor value and calculates a vehicle velocity based on the calculated vehicle deceleration. The vehicle velocity calculator calculates the temporary vehicle deceleration by offsetting a first correction amount to a deceleration side in relation to the acceleration sensor value. When a brake pedal operation amount by a driver is equal to or smaller than a first threshold and that an absolute value of the wheel deceleration is equal to or larger than an absolute value of a second threshold are met, the first correction amount is set to be smaller than when the conditions are not met.

5 Claims, 12 Drawing Sheets

(51) Int. Cl.
*B60T 8/1769* (2006.01)
*B60T 8/88* (2006.01)
*B60T 8/1761* (2006.01)
*B60T 8/1763* (2006.01)

(52) U.S. Cl.
CPC ............... B60T 8/885 (2013.01); *B60T 8/176* (2013.01); *B60T 2220/04* (2013.01); *B60T 2250/04* (2013.01); *B60T 2250/06* (2013.01); *B60T 2270/402* (2013.01); *B60T 2270/411* (2013.01)

(56) References Cited

U.S. PATENT DOCUMENTS

| | | | | |
|---|---|---|---|---|
| 4,964,047 | A | * | 10/1990 | Matsuda ........................ 701/74 |
| 5,065,327 | A | * | 11/1991 | Yahagi et al. ................... 701/74 |
| 5,203,821 | A | * | 4/1993 | Tanaka .......................... 73/1.38 |
| 5,243,564 | A | * | 9/1993 | Ikeda et al. ..................... 367/91 |
| 5,272,636 | A | * | 12/1993 | Buschmann et al. ........... 701/72 |
| 5,282,675 | A | * | 2/1994 | Okubo et al. .................. 303/174 |
| 5,559,702 | A | | 9/1996 | Kojima et al. |
| 5,566,094 | A | * | 10/1996 | Kojima et al. .................. 702/87 |
| 5,575,543 | A | * | 11/1996 | Pheonix ........................ 303/155 |
| 5,579,230 | A | | 11/1996 | Lin et al. |
| 5,719,770 | A | * | 2/1998 | Matsuno ........................ 701/71 |
| 5,829,847 | A | * | 11/1998 | Tozu et al. .................... 303/167 |
| 6,776,462 | B2 | * | 8/2004 | Inoue et al. ................... 303/171 |
| 2013/0297189 | A1 | | 11/2013 | Cornils et al. |

FOREIGN PATENT DOCUMENTS

| | | |
|---|---|---|
| JP | 04293651 | 10/1992 |
| JP | H04342649 | 11/1992 |

OTHER PUBLICATIONS

Search Report for related EP application No. 14172942.6-1756 dated Nov. 18, 2014, 8 pages.
Japanese Office Action for related JP application No. 2013-128854 dated Jun. 2, 2015, 6 pages.

* cited by examiner

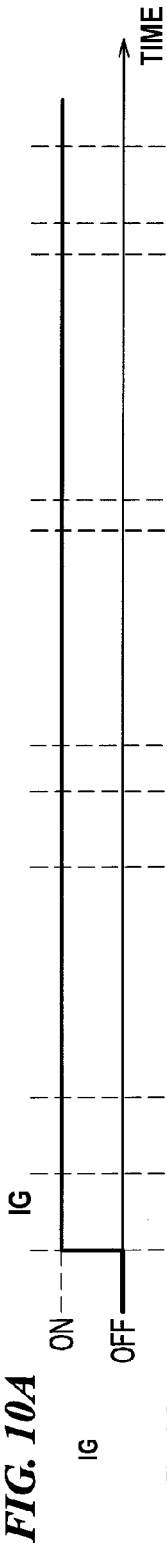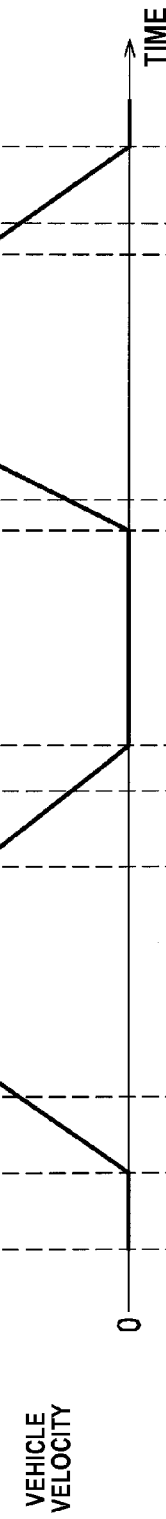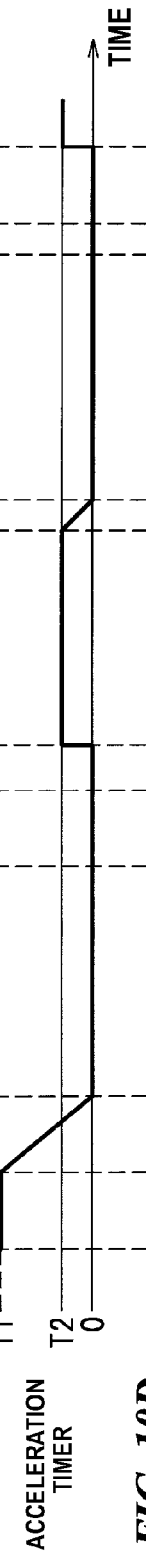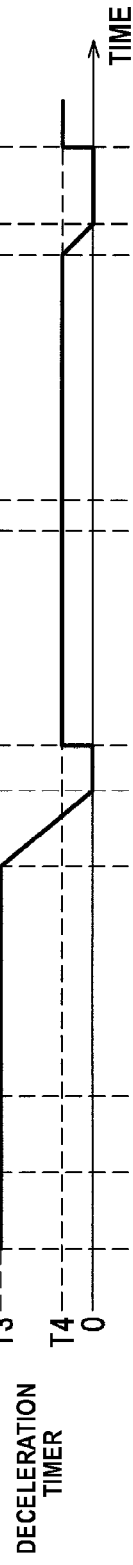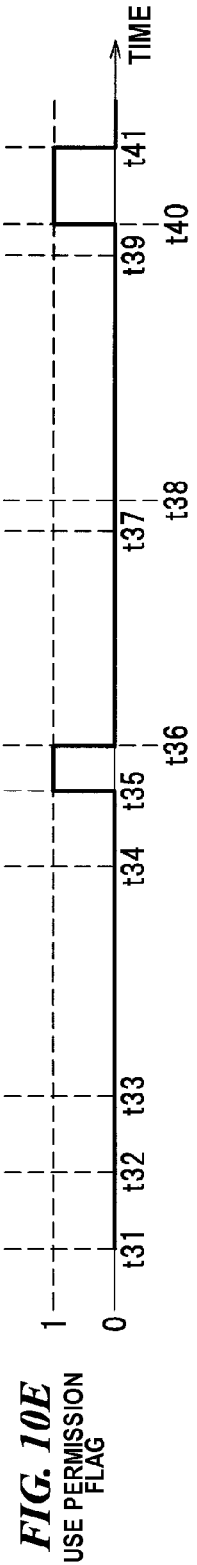

VEHICLE BRAKE HYDRAULIC CONTROLLER

CROSS-REFERENCE TO RELATED APPLICATION(S)

This application claims priority from Japanese Patent Application No. 2013-128854 filed on Jun. 19, 2013, the entire contents of which are incorporated herein by reference.

FIELD

Embodiments described herein generally relate to a vehicle brake hydraulic controller.

BACKGROUND

As a vehicle brake hydraulic controller which is mounted in a four-wheel drive vehicle, a conventional configuration is disclosed in which a locking tendency is determined by calculating a vehicle velocity based on an acceleration which is acquired by an acceleration sensor and obtaining a slip rate through comparison of the vehicle velocity with wheel speeds (Refer to JP-H04-293651-A).

However, in determining on a locking tendency by depending upon an acceleration sensor like the one described in the prior art above, in case a failure, for example, occurs in which an output value from the acceleration sensor is fixed to a certain constant value (hereinafter, referred to as an "off fixing"), it is determined that a vehicle deceleration is not generated even if the driver depresses the brake pedal, resulting in a fear that an ABS (an anti-lock braking system) control erroneously interferes on a high-$\mu$ road.

SUMMARY

One object of the invention is to suppress the erroneous interference of an ABS control on a high-$\mu$ road or the like when an acceleration sensor falls in the off fixing.

According to one aspect of the present invention, there is provided
a vehicle brake hydraulic controller which is mounted in a four-wheel drive vehicle, including:
a wheel speed acquiring section configured to acquire a wheel speed from a wheel speed sensor;
a wheel deceleration calculator configured to calculate a wheel deceleration based on the wheel speed;
a vehicle velocity calculator configured to calculate a vehicle deceleration based on a temporary vehicle deceleration which is calculated by using an acceleration sensor value which is outputted from a longitudinal acceleration sensor which detects a longitudinal acceleration to thereby calculate a vehicle velocity based on the vehicle deceleration; and
a locking tendency determination section configured to determine from the vehicle velocity and the wheel speed whether or not there exists a locking tendency in a wheel,
wherein the vehicle velocity calculator calculates the temporary vehicle deceleration by offsetting a first correction amount to a deceleration side in relation to the acceleration sensor value, and
wherein, when conditions that a brake pedal operation amount by a driver is equal to or smaller than a first threshold and that an absolute value of the wheel deceleration is equal to or larger than an absolute value of a second threshold are met, the first correction amount is set to be smaller than when the conditions are not met.

According to this configuration, for example, when the vehicle is decelerated on a high-$\mu$ road with the acceleration sensor falling in the off fixing (for example, when the absolute value of the wheel deceleration is smaller than that of the second threshold, or the like), by the first correction amount being set to the large value, the temporary vehicle deceleration is offset largely to the deceleration side in relation to the acceleration sensor value, and this makes it difficult to determine that there exists a locking tendency or there will be occurring an incipient wheel lock in the wheels. Therefore, it is possible to suppress the erroneous interference of the ABS control. Additionally, under the circumstances where a cascade locking is likely to occur (when the brake pedal operation amount is small and the magnitude of the wheel deceleration is large), the first correction amount is set to a small value, whereby the temporary vehicle deceleration is offset small to the deceleration side in relation to the acceleration sensor value, and this makes it easy to determine that there exists a locking tendency or there will be occurring an incipient wheel lock in the wheels. Thus, it is possible to suppress the occurrence of a cascade locking.

There may be provided the vehicle brake hydraulic controller,
wherein the vehicle velocity calculator calculates the temporary vehicle deceleration by offsetting, in addition to the first correction amount, a second correction amount which corresponds to an output error component of the longitudinal acceleration sensor and a third correction amount which is set based on a road surface gradient in relation to the acceleration sensor value.

According to this configuration, by offsetting the second correction amount which corresponds to the output correction component of the acceleration sensor and the third correction amount which is set based on the road surface gradient in relation to the acceleration sensor value, it is possible to suppress the erroneous interference of the ABS control which would otherwise be triggered by the output error of the acceleration sensor and the influence of the road surface gradient.

There may be provided the vehicle brake hydraulic controller,
wherein the second correction amount is calculated by using a value which results from multiplying the acceleration sensor value by a predetermined ratio.

According to this configuration, by calculating the second correction amount by using the value which results from multiplying the acceleration sensor value by the predetermined ratio, the second correction amount becomes smaller as the acceleration sensor value becomes smaller, thereby making it possible to make the offset amount to the deceleration side smaller. Because of this, for example, under the circumstances where for example, a cascade locking is likely to occur (when the brake pedal operation amount is small and the magnitude of the wheel deceleration is large), the temporary deceleration is allowed to approach the acceleration sensor value as a result of the offset amount to the deceleration side decreases. This makes it easy to determine in those circumstances that there exists a locking tendency or there will be occurring an incipient wheel lock in the wheels, thereby making it possible to suppress the occurrence of a cascade locking.

There may be provided the vehicle brake hydraulic controller,
wherein the vehicle velocity calculator selects either of the temporary vehicle deceleration and a dry road surface deceleration which is set in advance so as to correspond to a dry road surface whose absolute value is smaller as the vehicle deceleration.

According to this configuration, when the absolute value of the temporary vehicle deceleration which is calculated based on the acceleration sensor value is larger than that of the dry road surface deceleration, since the dry road surface deceleration is used as the vehicle deceleration, it is possible to determine well on the dry road surface that there exists a locking tendency or there will be occurring an incipient wheel lock in the wheels.

There may be provided the vehicle brake hydraulic controller, further including:

a condition determination section which determines at least whether or not a condition that a difference between the acceleration sensor value and the wheel deceleration is equal to or smaller than a predetermined value is met, wherein, when the condition determination section determines that the condition is met, the vehicle velocity calculator sets the first correction amount based on the brake pedal operation amount and a magnitude of the wheel deceleration, and wherein, when the condition determination section does not determine that the condition is met, the vehicle velocity calculator sets the first correction amount such that an absolute value of the temporary vehicle deceleration is larger than an absolute value of the dry road surface deceleration which corresponds to the dry road surface.

According to this configuration, when it is not determined that the condition on the difference between the acceleration sensor value and the wheel deceleration is met, the absolute value of the temporary vehicle deceleration is larger than that of the dry road surface deceleration, and this causes the value whose absolute value is larger than the absolute value of the dry road surface deceleration to be used to calculate the vehicle velocity. Thus, it is possible to suppress the erroneous interference of the ABS control in those circumstances where the reliability of the acceleration sensor value is lowered to such an extent that the difference between the acceleration sensor value and the wheel deceleration exceeds the predetermined value.

According to the invention, it is possible to suppress the erroneous interference of the ABS control on the high-μ road or the like when the acceleration sensor falls in the off fixing.

BRIEF DESCRIPTION OF DRAWINGS

FIGS. 10A to 10E show time charts which illustrate an example of a determination method of a permission of use.

DETAILED DESCRIPTION

First Embodiment

Figure 1:
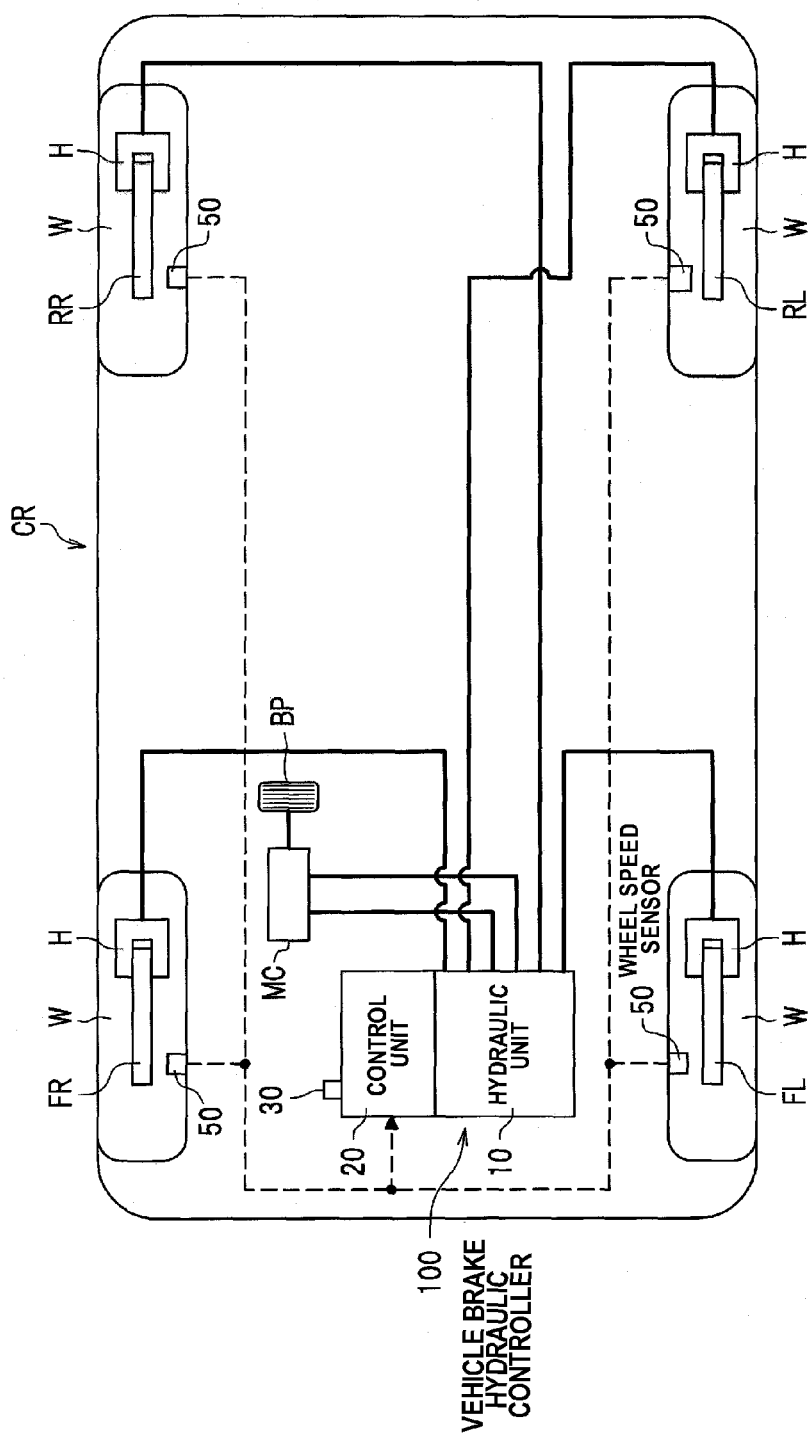
FIG. 1 is a block diagram of a vehicle which includes a vehicle brake hydraulic controller according to a first embodiment.

Referring to the drawings, a first embodiment of the invention will be described in detail. As shown in FIG. 1, a vehicle brake hydraulic controller 100 is mounted in a four-wheel drive vehicle CR to control a braking force (a brake hydraulic pressure) which is given individually to wheels W of the vehicle as required. The vehicle brake hydraulic controller 100 includes mainly a hydraulic unit 10 which includes fluid lines (hydraulic pressure lines) and various component parts and a control unit 20 which controls the various component parts in the hydraulic unit 10 as required. Wheel speed sensors 50 which detects wheel speeds of the individual wheels W and a longitudinal acceleration sensor 30 which detects a longitudinal acceleration which is applied to the vehicle CR are connected to the control unit 20 of the vehicle brake hydraulic controller 100. The results of detections by the wheel speed sensors 50 and the longitudinal acceleration sensor 30 are outputted to the control unit 20.

The control unit 20 includes, for example, a CPU, a RAM, a ROM, and input and output circuits and executes controls by performing various arithmetic operations based on inputs from various sensors including the wheel speed sensors 50 and the like and programs or data which are stored in the ROM. Wheel cylinders H are hydraulic pressure devices which transform a brake hydraulic pressure which is generated by a master cylinder MC and the vehicle brake hydraulic pressure system 100 into operation forces at wheel brakes FR, FL, RR, RL which are provided in the individual wheels W. The wheel cylinders H are connected individually to the hydraulic unit 10 via piping.

Figure 2:
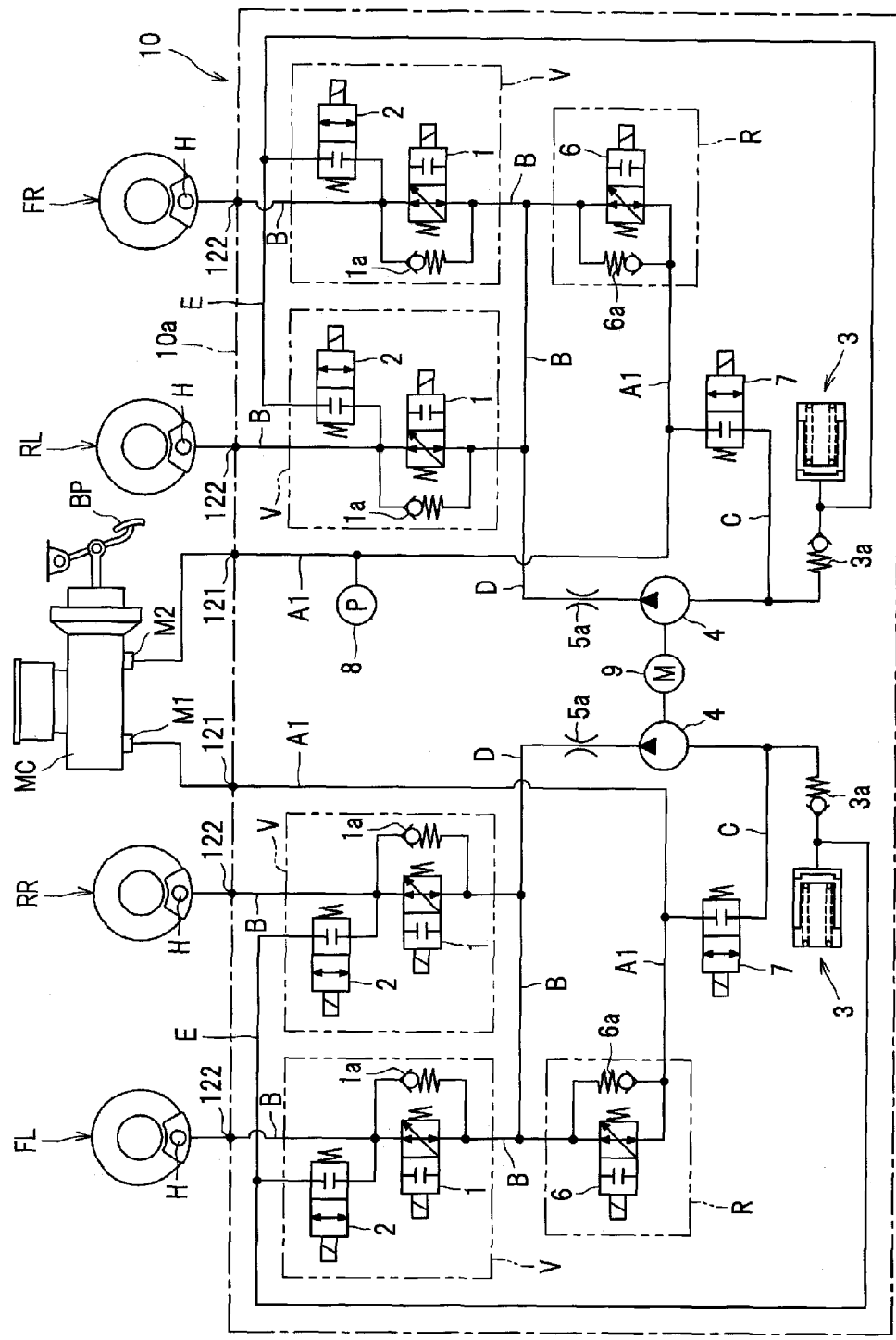
FIG. 2 is a brake hydraulic pressure circuit diagram of the vehicle brake hydraulic controller.

As shown in FIG. 2, the hydraulic unit 10 is disposed between the master cylinder MC which is a hydraulic pressure source which generates a brake hydraulic pressure which corresponds to a depressing effort applied to the brake pedal BP by the driver and the wheel brakes FR, FL, RR, RL. The hydraulic unit 10 is made up of a pump body 10a which is a basic member having fluid lines (hydraulic pressure lines) through which a brake fluid flows, pluralities of inlet valves 1 and outlet valves 2 which are provided on the fluid lines and the like. Two output ports M1, M2 of the master cylinder MC are connected individually to inlet ports 121 of the pump body 10a, and the output ports 122 of the pump body 10a are connected individually to each of wheel cylinders H. Thus, normally, communicating fluid lines are established from the inlet ports 121 to outlet ports 122 within the pump body 10a, whereby the depressing force applied to the brake pedal BP is transmitted individually to the wheel brakes FL, RR, RL, FR.

The fluid line which starts from the output port M1 communicates with the left front wheel brake FL and the right rear wheel brake RR. The fluid line which starts from the output port M2 communicates with the right front wheel brake FR and the left rear wheel brake RL. In the following description, the fluid line which starts from the output port M1 will be referred to as a "first system", and the fluid line which starts from the outlet port M2 will be referred to as a "second system."

In the hydraulic unit 10, two control valve units V are provided in the first system so as to correspond individually to the wheel brakes FL, RR, and similarly, two control valve units V are provided in the second system so as to correspond individually to the wheel brakes RL, FR. In the hydraulic unit 10, a reservoir 3, a pump 4, an orifice 5a, a regulator valve unit (regulator) R, and a suction valve 7 are provided in each of the first system and the second system. Further, in the hydraulic unit 10, a common motor 9 is provided which is configured to drive the pump 4 in the first system and the pump 4 in the second system. This motor 9 is a rotational speed controllable motor, and in this embodiment, the rotational speed of the motor 9 is controlled through a duty control. In this embodiment, a pressure sensor 8 is provided only in the second system.

In the following description, the fluid lines from the output ports M1, M2 of the master cylinder MC to the regulator valve units R will be referred to as "output hydraulic pressure lines A1." The fluid lines from the regulator valve unit R to the wheel brakes FL, RR in the first system and the fluid lines from the regulator valve unit R to the wheel brakes RL, FR in the second system will each be referred to as a "wheel hydraulic pressure line B." The fluid lines from the output hydraulic pressure lines A1 to the pumps 4 will each be referred to as a "suction hydraulic pressure line C," and the fluid lines from the pumps 4 to the wheel hydraulic pressure lines B will each be referred to as a "discharge hydraulic pressure line D." Further, the fluid lines from the wheel hydraulic pressure lines B to the suction hydraulic pressure lines C will each be referred to as a "release line E."

The control valve units V control the communication of hydraulic pressures from the master cylinder MC or the pumps 4 to the wheel brakes FL, RR, RL, FR (specifically speaking, to the wheel cylinders H) and can raise, hold or lower the pressures of the wheel cylinders H. To make this happen, the control valves V each include the inlet valve 1, the outlet valve 2 and a check valve 1a.

The inlet valves 1 are normally open linear solenoid valves (proportional solenoid valves) which are provided between the wheel brakes FL, RR, RL, FR and the master cylinder MC, that is, in the corresponding wheel hydraulic lines B. This enables a hydraulic pressure difference between an upstream side and a downstream side of the inlet valve 1 to be regulated according to the value of a drive current which flows to the inlet valve 1. Namely, with the hydraulic pressure on the upstream side being relatively higher than the hydraulic pressure on the downstream side of the inlet valve 1, when the drive current is supplied to the inlet valve 1, the inlet valve 1 opens until the hydraulic pressure difference between the hydraulic pressure on the upstream side and the hydraulic pressure on the downstream side of the inlet valve 1 becomes a hydraulic pressure difference which corresponds to the drive current, whereby the hydraulic pressure on the downstream side of the inlet valve 1 is raised.

The outlet valves 2 are normally closed solenoid valves which are interposed individually between the wheel brakes FL, RR, RL, FR and the reservoirs 3, that is, between the wheel hydraulic pressure lines B and the release lines E. Although the outlet valves 2 are normally closed, the outlet valves 2 are opened by the control unit 20 when the wheels W are about to lock, whereby the brake hydraulic pressures acting on the wheel brakes FL, FR, RL, RR are reduced by causing the brake fluid therein to escape therefrom to the corresponding reservoirs 3.

The check valves 1a are connected individually to the inlet valves 1 in parallel. The check valves 1a permit the brake fluid to flow only in the direction of the master cylinder MC from the corresponding wheel brakes FL, FR, RL, RR. The check valves 1a permit the brake fluid to flow in the direction of the master cylinder MC from the corresponding wheel brakes FL, FR, RL, RR even in such a state that the inlet valves 1 are closed when the input from the brake pedal BP is released.

The reservoirs 3 are provided in the release lines E and have a function to reserve therein the brake fluid which escapes when the outlet valves 2 are opened to reduce the brake hydraulic pressures thereat. Check valves 3a are interposed individually between the reservoirs 3 and the pumps 4 to permit the brake fluid to flow only in the direction of the pumps 4 from the corresponding reservoirs 3.

The pumps 4 are each interposed between the suction hydraulic pressure line C which communicates with the output hydraulic pressure line A1 and the discharge hydraulic pressure line D which communicates with the wheel hydraulic pressure lines B and have a function to suck out the brake fluid reserved in the reservoir 3 to discharge it into the discharge hydraulic pressure line D. By giving the function to the motors 4, the brake fluid sucked and reserved in the reservoir 3 can be returned to the maser cylinder MC, and a brake hydraulic pressure can be generated whether or not the brake pedal BP is operated, whereby braking forces can be generated at the wheel brakes FL, RR, RL, FR.

It is noted that the amount of brake fluid discharged by the pump 4 depends on the rotational speed (the duty ratio) of the motor 9. Namely, the discharge amount of brake fluid discharged by the pump 4 increases as the rotational speed (the duty ratio) of the motor 9 increases.

The orifices 5a dampen the pulsation of the discharge hydraulic pressure lines D due to the pressure of the brake fluid discharged from the pumps 4.

The regulator valve units R normally function to permit the brake fluid to flow from the output hydraulic pressure lines A1 to the wheel hydraulic pressure lines B. When the pressures at the wheel cylinders H are increased by using the brake hydraulic pressures generated by the pumps 4, the regulator valve units R function to control the pressures in the discharge hydraulic pressure lines D, the wheel hydraulic pressure lines B and the control valve units V (the wheel cylinders H) to a set value or lower while cutting off the flow of brake fluid from the output hydraulic pressure lines A1 to the wheel hydraulic pressure lines B. The regulator valve units R each include a selector valve 6 and a check valve 6a.

The selector valves 6 are normally open linear solenoid valves which are interposed individually between the output hydraulic pressure lines A1 which communicate with the master cylinder MC and the wheel hydraulic pressure lines B which communicate with the wheel brakes FL, FR, RL, RR. Thus, a hydraulic pressure difference between a hydraulic pressure on an upstream side and a hydraulic pressure on a downstream side of the selector valve 6 is controlled according to the value of a drive current which flows to the selector valve 6, whereby the pressures in the discharge hydraulic pressure line D and the wheel hydraulic pressure lines B can be controlled to a set value or lower.

The check valves 6a are connected individually to the selector valves 6 in parallel. The check valves 6a are one-way valves which permit the brake fluid to flow only in the direction of the wheel hydraulic pressure lines B from the output hydraulic pressure lines A1.

The suction valves 7 are normally closed solenoid valves which are provided in the suction hydraulic pressure lines C to switch the suction hydraulic pressure lines C between an open state and a cut-off state. When the selector valves 6 are closed, for example, when the brake hydraulic pressures are applied to the wheel brakes FL, FR, RL, RR during a brake assist control, the suction valves 7 are controlled to be opened by the control unit 20.

The pressure sensor 8 detects a brake hydraulic pressure in the output hydraulic pressure line A1, and the results of a detection made by the pressure sensor 8 are inputted into the control unit 20.

Figure 3:
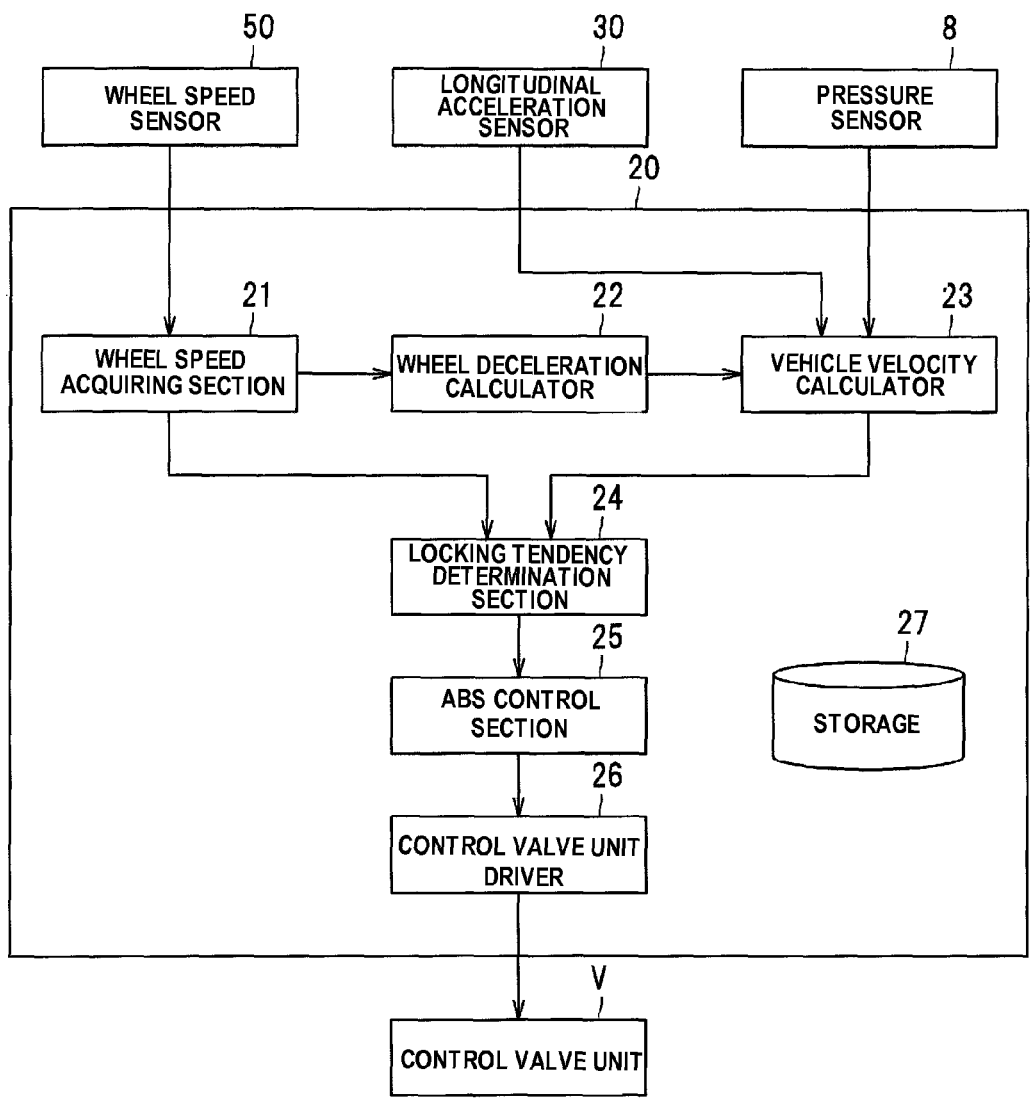
FIG. 3 is a block diagram showing the configuration of a control unit.

Next, the control unit 20 will be described in detail. As shown in FIG. 3, the control unit 20 controls the operations of the wheel brakes FL, RR, RL, FR by controlling the opening or closing operations of the control valve units V, the regulator valve units R (the selector valves 6) and the suction valves 7 and the operation of the motor 9 in the hydraulic unit 10 based mainly on signals inputted from the wheel speed sensors 50 and the like. The control unit 20 includes a wheel speed acquiring section 21, a wheel deceleration calculator 22, a vehicle velocity calculator 23, a locking tendency determination section 24, an ABS control section 25, a control valve unit driver 26 and a storage 27.

The wheel speed acquiring section 21 has a function to acquire wheel speeds Vw from the wheel speed sensors 50 and outputs the wheel speeds Vw acquired to the wheel deceleration calculator 22, the vehicle velocity calculator 23 and the locking tendency determination section 24.

The wheel deceleration calculator 22 has a function to calculate wheel decelerations $-Aw$ based on the wheel speeds Vw and outputs the wheel decelerations $-Aw$ calculated to the vehicle velocity calculator 23. In this embodiment, a deceleration (an acceleration applied to the vehicle body in a rearward direction) is treated as a negative value, and Aw resulting from removing the negative sign from $-Aw$ is understood to have a positive value.

The vehicle velocity calculator 23 has a function to calculate a vehicle deceleration $-Ac$ based on a temporary vehicle deceleration $-At$ which is calculated by using an acceleration sensor value $-As$ which is outputted from the longitudinal acceleration sensor 30 and a function to calculate a vehicle velocity Vc based on the vehicle deceleration $-Ac$ so calculated.

Specifically speaking, the vehicle velocity calculator 23 calculates a temporary vehicle deceleration $-At$ by offsetting a first correction amount $\alpha$, a second correction amount $\beta$ and a third correction amount $\gamma$ to a deceleration side in relation to the acceleration sensor value $-As$ which results during deceleration. Namely, the vehicle velocity calculator 23 calculates the temporary vehicle deceleration $-At$ by the following equation (1).

$$-At=-As-(\alpha+\beta+\gamma) \qquad (1)$$

Figure 4:
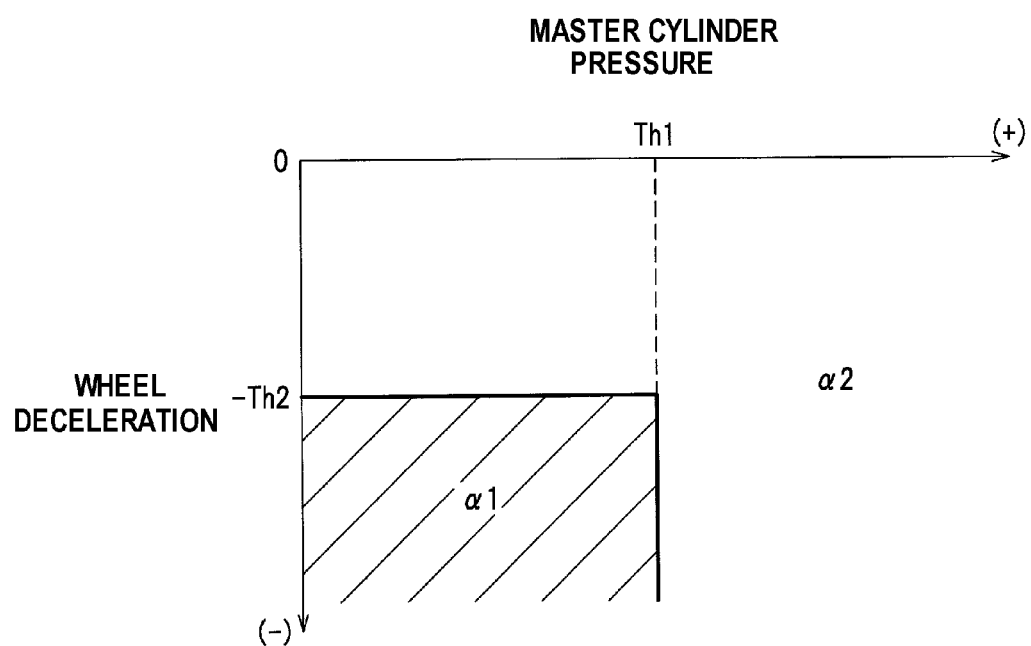
FIG. 4 is a map by which a first correction amount is set.

The first correction amount $\alpha$ is obtained from a map shown in FIG. 4 and is set to a value $\alpha 1$ when a condition that a master cylinder pressure which is an example of an amount of brake pedal operation by the driver is equal to or smaller than a first threshold Th1 and a condition that the wheel deceleration $-Aw$ is equal to or smaller than a second threshold $-Th2$ (the absolute value of the wheel deceleration $-Aw$ is equal to or larger than the absolute value of the second threshold value $-Th2$) are met. The value $\alpha 1$ is smaller than a value $\alpha 2$ to which the first correction amount $\alpha$ is set when the conditions are not met.

The second correction amount $\beta$ corresponds to an output error component of the longitudinal acceleration sensor 30. In this embodiment, the second correction amount $\beta$ is calculated by adding a pre-set positive fixed value to a value resulting from multiplying the absolute value of the acceleration sensor value $-As$ by a predetermined ratio, The third correction value $\gamma$ is set based on a road surface gradient and is set to a positive fixed value in this embodiment.

In this way, since not only the first correction amount $\alpha$ but also the second correction amount $\beta$ which corresponds to the output error component of the longitudinal acceleration sensor 30 and the third correction amount $\gamma$ which is set based on the road surface gradient are offset in relation to the acceleration sensor value, it is possible to prevent the interference of the ABS control which is triggered by the effects of the output error of the longitudinal acceleration sensor 30 and the road surface gradient.

The vehicle velocity calculator 23 selects as the vehicle deceleration $-Ac$ either of the temporary vehicle deceleration $-At$ which is calculated in the way described above and a dry road surface deceleration $-Ad$ which is set in advance so as to correspond to a dry road surface whose absolute value is smaller. The dry road surface deceleration $-Ad$ is a deceleration having a large absolute value which is generated when the vehicle is slowed by applying the brakes on a dry road surface and is set appropriately through experiments or simulations. Specifically speaking, the vehicle velocity calculator 23 calculates the vehicle deceleration $-Ac$ by the following equation (2).

$$-Ac=\max\{-At,-Ad\} \qquad (2)$$

Namely, in this embodiment, since the deceleration is treated as a negative value, either of the temporary vehicle deceleration $-At$ and the dry road surface deceleration $-Ad$ whose negative value is larger (whose absolute value is smaller, that is, which is closer to 0) is selected as the vehicle deceleration $-Ac$.

In this embodiment, in the map shown in FIG. 4, $\alpha 1$ is set to such a value that the absolute value of the temporary vehicle deceleration $-At$ is smaller than the absolute value of the dry road surface deceleration $-Ad$, and $\alpha 2$ is set to such a value that the absolute value of the temporary vehicle deceleration $-At$ is larger than the absolute value of the dry road surface deceleration $-Ad$. In other words, $\alpha 1$ and $\alpha 2$ are set so appropriately that when $\alpha 1$ is set as the first correction value $\alpha$, the temporary vehicle deceleration $-At$ is selected as the vehicle deceleration $-Ac$, while when $\alpha 2$ is set as the first correction value $\alpha$, the dry road surface deceleration $-Ad$ is selected as the vehicle deceleration $-Ac$.

Further, the vehicle velocity calculator 23 cannot calculate the temporary vehicle velocity $-At$ accurately at a point in time when the driver depresses the brake pedal, and therefore, the vehicle velocity calculator 23 never fails to set the dry road surface deceleration $-Ad$ as the vehicle deceleration $-Ac$ without using the equation (2) described above. Then, after the point in time has elapsed, the vehicle velocity calculator 23 calculates the vehicle deceleration $-Ac$ by using the equation (2) above. Furthermore, when the ABS control is initiated, the vehicle velocity calculator 23 sets the vehicle deceleration $-Ac$ which is calculated at the point in time when the ABS control is initiated as a vehicle deceleration for use in calculation of a vehicle velocity for a predetermined period of time without changing it. The predetermined period of time means a period of time that elapses from the point in time when the ABS control is initiated until a point in time when a second pressure raising control is initiated (a period of time from time t3 to time t8 shown in FIGS. 5A and 5C). When the second pressure raising control is executed in the ABS control, the vehicle velocity calculator 23 calculates a vehicle deceleration −Ac from wheel speeds detected during a first pressure raising control and wheel speeds detected during the second pressure raising control and sets the vehicle deceleration −Ac so calculated as the vehicle deceleration for use in calculation of the vehicle velocity until the end of the ABS control.

Having calculated the vehicle deceleration −Ac in the way described above, the vehicle velocity calculator 23 calculates a vehicle velocity Vc based on the vehicle deceleration −Ac calculated. Specifically speaking, the vehicle velocity calculator 23 calculates a vehicle velocity Vc by calculating an initial vehicle velocity Vc1 from wheel speeds Vw resulting immediately before the brake pedal BP is depressed and adding up vehicle decelerations −Ac which are calculated after the brake pedal BP is depressed to the initial vehicle velocity Vc1 so calculated. The method of calculating the vehicle velocity is not limited to the method described above, and hence, any method may be made use of.

Then, after having calculated the vehicle velocity Vc, the vehicle velocity calculator 23 outputs the vehicle velocity so calculated to the locking tendency determination section 24.

The locking determination section 24 has a function to determine whether or not there exists a locking tendency or there occurs an incipient wheel lock in the wheels W from the vehicle velocity Vc and the wheel speeds Vw. Specifically speaking, the locking tendency determination section 24 obtains a difference between the vehicle velocity Vc and the wheel speeds Vw as a slip amount and determines that there will occur an incipient wheel lock in the wheels W when the slip amount reaches or exceeds a predetermined value. Then, when determining that there will occur an incipient wheel lock in the wheels W, the locking tendency determination section 24 outputs a lock signal which signals the occurrence of an incipient wheel lock to the ABS control section 25. On the other hand, when determining that there will be no incipient wheel lock in the wheels W, the locking tendency determination section 24 outputs a non-lock signal which signals the occurrence of no incipient wheel lock in the wheels W to the ABS control section 25.

The ABS control section 25 receives the lock signal from the locking tendency determination section 24, and when wheel accelerations which are calculated from the wheel speeds are 0 or smaller, the ABS control section 25 controls the control valve unit driver 26 so as to reduce the pressures at the wheel cylinders H in order to prevent the occurrence of a wheel lock in the wheels W. Namely, when starting the pressure reduction control, the ABS control section 25 outputs a hydraulic pressure reduction instruction to the control valve unit driver 26.

When the wheel accelerations become larger than 0, the ABS control section 25 closes both the inlet valves 1 and the outlet valves 2 so as to hold the brake hydraulic pressures in the wheel cylinders. Namely, when starting the holding control, the ABS control section 25 outputs a hydraulic pressure holding instruction to the control valve unit driver 26.

On the other hand, when receiving the non-lock signal from the locking tendency determination section 24 and the wheel accelerations become equal to or smaller than 0, the ABS control section 25 opens the inlet valves 1 while closing the outlet valves 2 to thereby raise the hydraulic pressures at the wheel cylinders H. Namely, when starting the pressure raising control, the ABS control section 25 outputs a hydraulic pressure raising instruction to the control valve unit driver 26.

The control valve unit driver 26 has a function to control the inlet valves 1 and the outlet valves 2 based on the hydraulic pressure reduction instruction, the hydraulic pressure holding instruction or the hydraulic pressure raising instruction issued from the ABS control section 25. Specifically speaking, when receiving the hydraulic pressure reduction instruction, the control valve unit driver 26 closes the inlet valves 1 while opening the outlet valves 2 to thereby discharge the brake fluid within the wheel cylinders H into the reservoir 3, to reduce the hydraulic pressures in the wheel cylinders H.

When receiving the hydraulic pressure holding instruction, the control valve unit driver 26 closes both the inlet valves 1 and the outlet valves 2 to thereby hold the hydraulic pressures in the wheel cylinders. When receiving the hydraulic pressure raising instruction, the control valve unit driver 26 closes the outlet valves 2 while opening the inlet valves 1 to thereby raise the hydraulic pressures in the wheel cylinders H.

The map shown in FIG. 4, the equations (1), (2) and thresholds are stored in the storage 27.

Next, working effects produced by calculating the vehicle velocity Vc by making use of the calculation method according to the first embodiment will be described by reference to FIGS. 5A to 6C. When the driver depresses the brake pedal BP while the driver is driving the vehicle on a low-μ road surface, as shown in FIGS. 5A and 5B, the control unit 20 firstly calculates a vehicle velocity Vc based on the wheel speeds Vw that results immediately before the driver depresses the brake pedal BP at a point in time when the driver depresses the brake pedal BP (time t1).

Thereafter, the control unit 20 calculates vehicle velocities Vc by making use of the equations (1), (2) described above until time t3 when the ABS control is started. As this occurs, when a master cylinder pressure Pm shown in FIG. 5C is equal to or smaller than the first threshold Th1 and wheels speeds, not shown, are equal to or smaller than the second threshold −Th2, that is, under the circumstances where a cascade locking occurs easily, the control unit 20 sets the smaller value α1 as the first correction amount α to thereby calculate a temporary vehicle velocity Vt based on the temporary deceleration −At. Namely, the control unit 20 selects the temporary vehicle velocity Vt which is calculated by using the temporary vehicle deceleration −At rather than the temporary vehicle velocity Vd which is calculated by using the dry road surface deceleration −Ad as the vehicle velocity Vc which is used to calculate a slip amount. In FIGS. 5A to 5C and the like, as a matter of convenience, reference character Vc is put additionally to the side of reference character (Vt in FIGS. 5A to 5C) of the temporary vehicle velocity which is selected as the vehicle velocity Vc.

The temporary vehicle velocity Vt is calculated based on the temporary vehicle deceleration −At which is calculated by offsetting the correction amounts α, β, γ against the acceleration sensor value, and therefore, the temporary vehicle velocity Vt is offset to the deceleration side in relation to a vehicle velocity Vg which is calculated based on the acceleration sensor value.

Figure 5A:
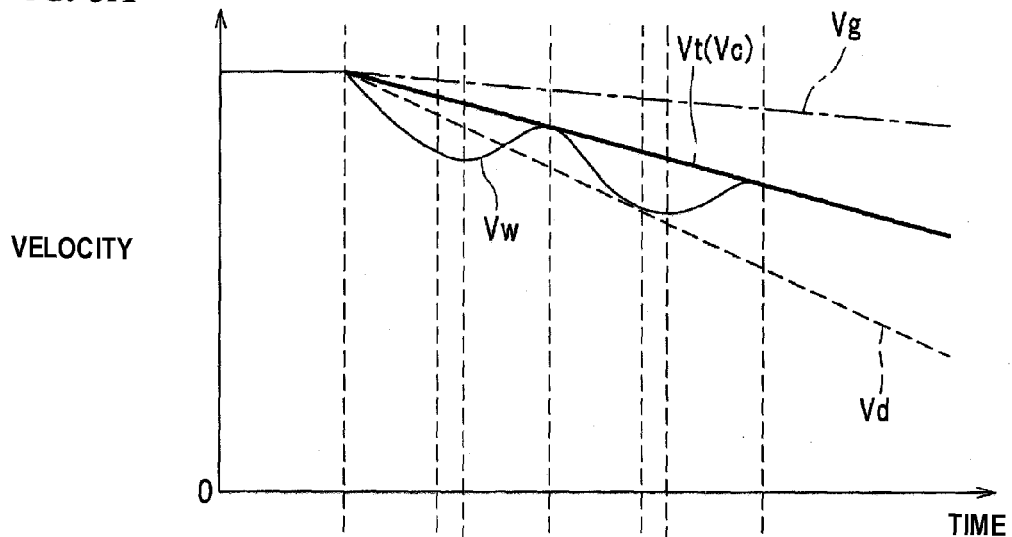
FIGS. 5A to 5C show time charts which illustrate working effects on a low-μ road surface which are produced by a calculation method according the first embodiment.
Figure 5B:
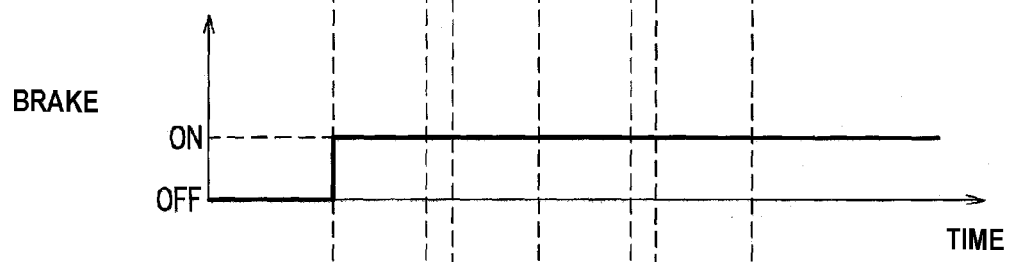
Figure 5C:
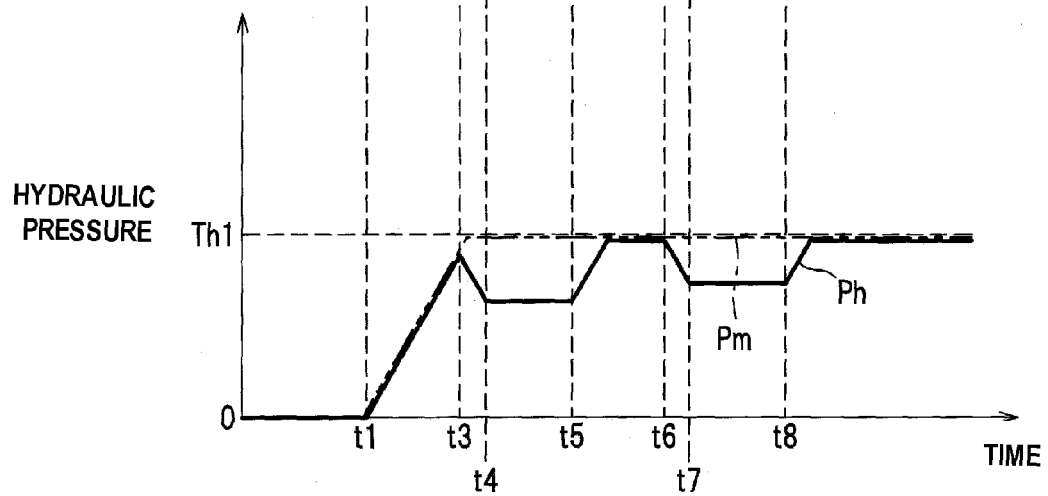

Then, as shown in FIGS. 5A and 5C, when the slip amount (a difference between the vehicle velocity Vc and the wheel speeds Vw) reaches or exceeds a predetermined value (time t3), the control unit 20 determines that there exists a locking tendency, that is, there occurs an incipient wheel lock in the wheels W. Then, the control unit 20 executes the hydraulic pressure reduction control on condition that the wheel accelerations are equal to or smaller than 0 to thereby reduce wheel cylinder pressures Ph. As has been described before, by selecting the temporary vehicle velocity Vt which is calculated by using the temporary vehicle deceleration −At as the vehicle velocity Vc which is used to calculate the slip amount, compared with, for example, a case where the temporary vehicle velocity Vd which is calculated by using the dry road surface deceleration −Ad as the vehicle velocity Vc, under the circumstances where a cascade locking occurs easily, it is easy to determine based on the slip amount that there exists a locking tendency or there will be occurring an incipient wheel lock in the wheels W (time t3), whereby it is possible to suppress the occurrence of a cascade locking.

Thereafter, the control unit 20 executes a known ABS control based on the vehicle velocity Vc which is calculated in the way that has been described before. Namely, the control unit 20 executes the hydraulic pressure holding control when the wheel decelerations become larger than 0 during the hydraulic pressure reduction control (time t4), whereby the locking tendency of the wheels W is eliminated. On the other hand, the control unit 20 executes the hydraulic pressure raising control when the wheel decelerations are equal to or smaller than 0 (time t5). Thereafter, the control unit 20 executes the hydraulic pressure reduction control (time t6), the hydraulic pressure holding control (time t7) and the hydraulic pressure raising control (time t8) in the same ways as those described above.

Figure 6A:
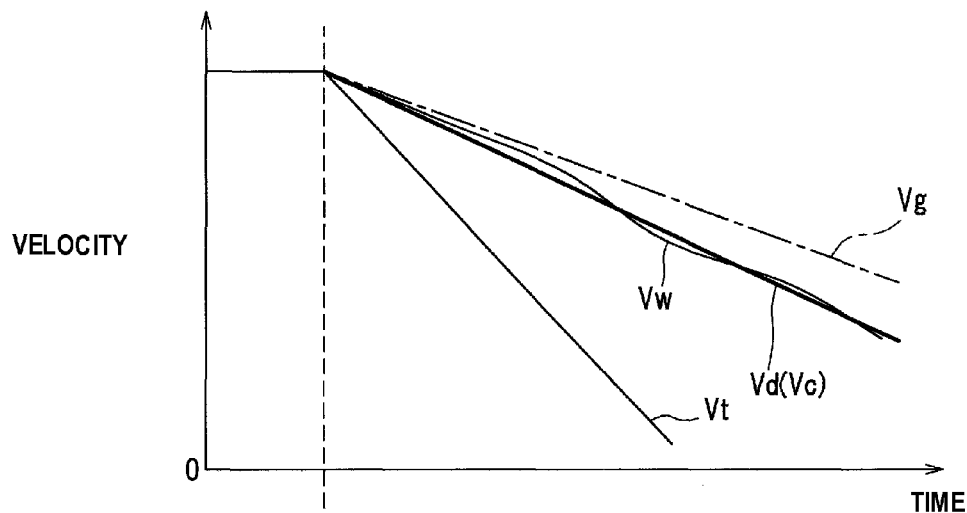
FIGS. 6A to 6C show time charts which illustrate working effects on a dry road surface which are produced by the calculation method according the first embodiment.
Figure 6B:
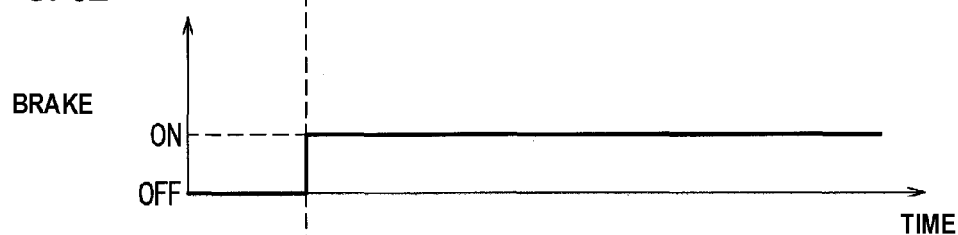
Figure 6C:
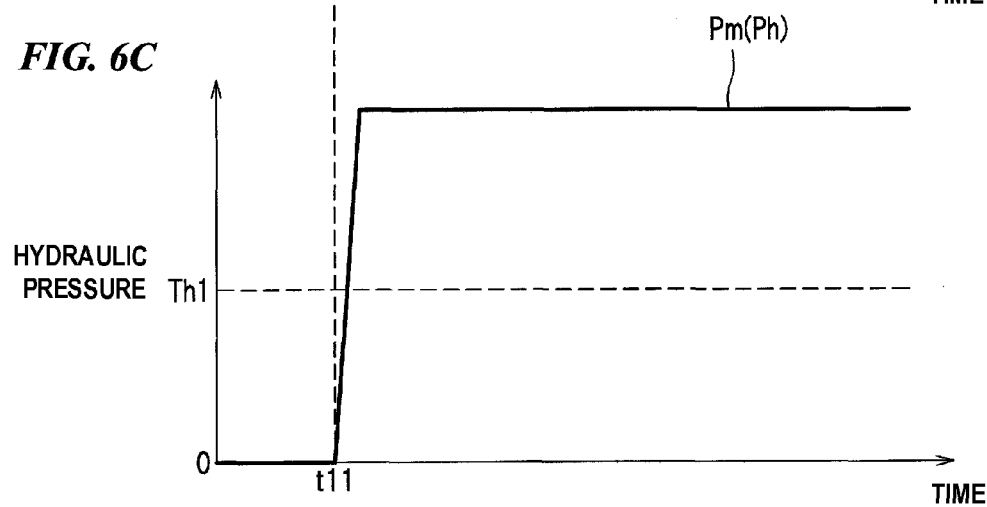

When the driver depresses the brake pedal BP while the driver is driving the vehicle on the dry road surface (the high-μ road surface), as shown in FIGS. 6A to 6C, the control unit 20 firstly calculates a vehicle velocity Vc based on the wheel speeds Vw in the same way as that described above at the point in time (time t11) when the driver depresses the brake pedal BR. Thereafter, the control unit 20 calculates vehicle velocities by using the equations (1), (2) in the same way as that described above.

When the master cylinder pressure Pm is larger than the first threshold Th1, that is, under the circumstances where no cascade locking is likely to occur, the control unit 20 calculates a temporary vehicle velocity Vd based on the dry road surface deceleration −Ad by setting the larger value α2 as the first correction amount α. Namely, the control unit 20 selects the temporary vehicle velocity Vd which is calculated by using the dry road surface deceleration −Ad rather than the temporary vehicle deceleration Vt which is calculated by using the temporary deceleration −At as the vehicle velocity Vc which is used to calculate the slip amount.

By doing so, under the circumstances where no cascade locking is likely to occur, a slip amount (a difference between the vehicle velocity Vc and the wheel speeds Vw) is calculated as a small value, and this makes it difficult to determine that there exists a locking tendency or there will be occurring an incipient wheel lock in the wheels W, whereby it is possible to suppress the erroneous interference of the ABS control.

Figure 7A:
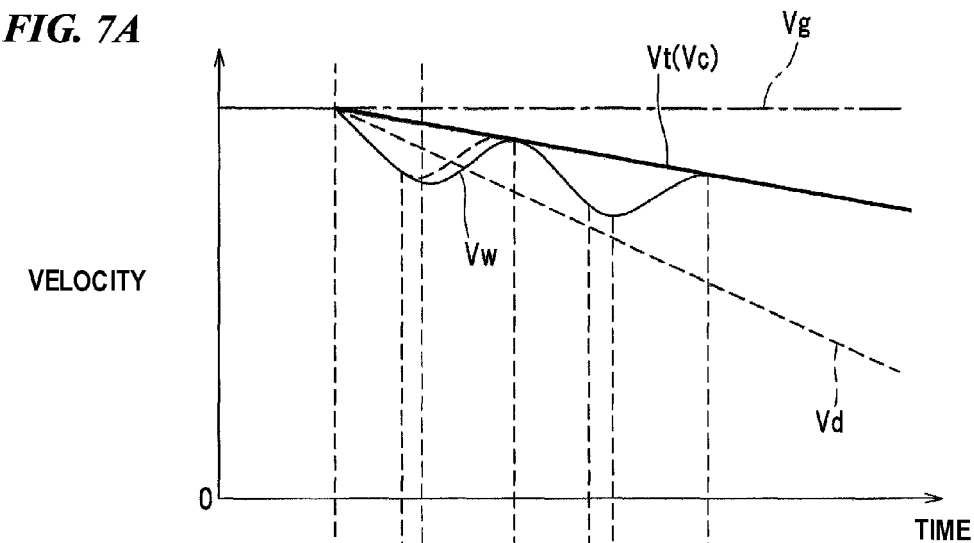
FIGS. 7A to 7C shows time charts which show changes in parameters when a longitudinal acceleration sensor falls in an off fixing in the same road surface conditions and brake conditions as those shown in FIGS. 5A to 5C.
Figure 7B:
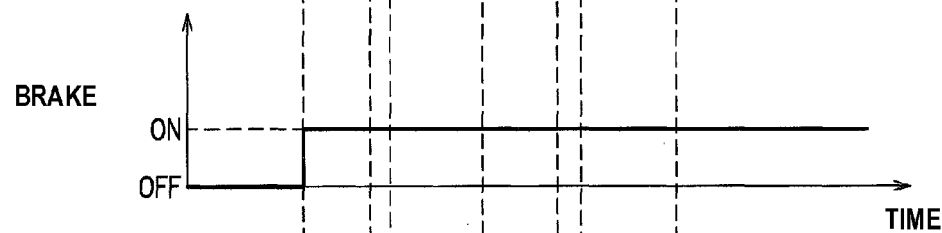
Figure 7C:
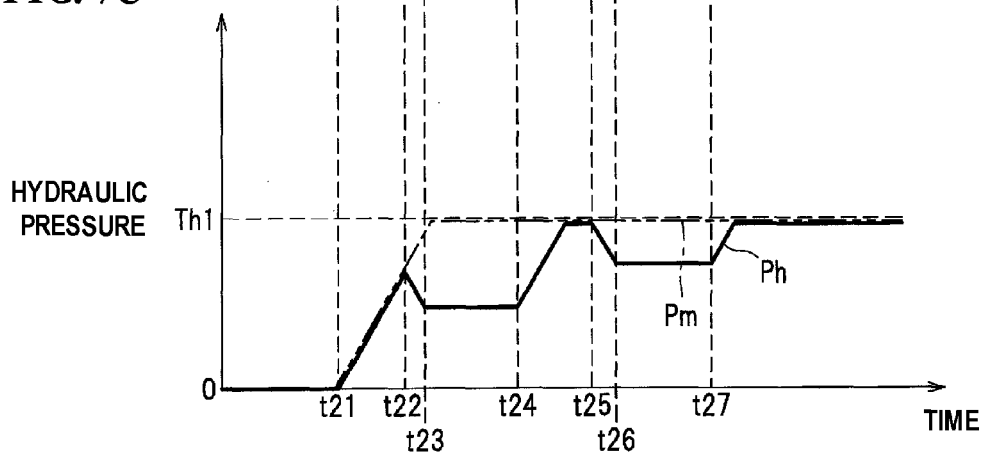

As shown in FIG. 7A, when the longitudinal acceleration sensor 30 falls in an off fixing as shown in FIG. 7A, the vehicle velocity Vg which is calculated based on an acceleration sensor value from the longitudinal acceleration sensor 30 is fixed to a certain constant value. As this occurs, when the driver depresses the brake pedal BP (refer to FIGS. 7B and 7C) in the same way and under the same road surface conditions as those of the case described in FIGS. 5A to 5C (time t21), as with the case described in FIGS. 5A to 5C, the master cylinder pressure Pm remains equal to or smaller than the first threshold Th1, and the wheel deceleration, no shown, remains equal to or smaller than the second threshold −Th2. Therefore, the control unit 20 sets the smaller value a1 as the first correction value α and calculates a temporary vehicle velocity Vt based on the temporary vehicle deceleration −At. Namely, the control unit 20 selects the temporary vehicle velocity Vt which is calculated by using the temporary vehicle deceleration −At rather than the temporary vehicle velocity Vd which is calculated by using the dry road surface deceleration −Ad as the vehicle velocity Vc which is used to calculate the slip amount.

As has been described before, since the vehicle velocity Vg which is calculated based on the acceleration sensor value is fixed to the constant value as described above, the gradient of the temporary vehicle velocity Vt calculated is less steep than that of the temporary vehicle velocity Vt in FIGS. 5A to 5C. However, even in that case, since the temporary vehicle velocity Vt is offset to the deceleration side in relation to the vehicle velocity Vg, compared with a case where a slip amount is calculated based on the fixed vehicle velocity Vg (refer to a broken line in FIG. 7A), a timing (time t22) at which the ABS control is started can be delayed, whereby it is possible to suppress the occurrence of a cascade locking while ensuring a good braking force. After the ABS control is started, the control unit 20 executes the hydraulic pressure holding control (time t23), the hydraulic pressure raising control (time t24), the hydraulic pressure reduction control (time t25), the hydraulic pressure holding control (time t26), and the hydraulic pressure raising control (time t27) in the same way as that described above.

Figure 8A:
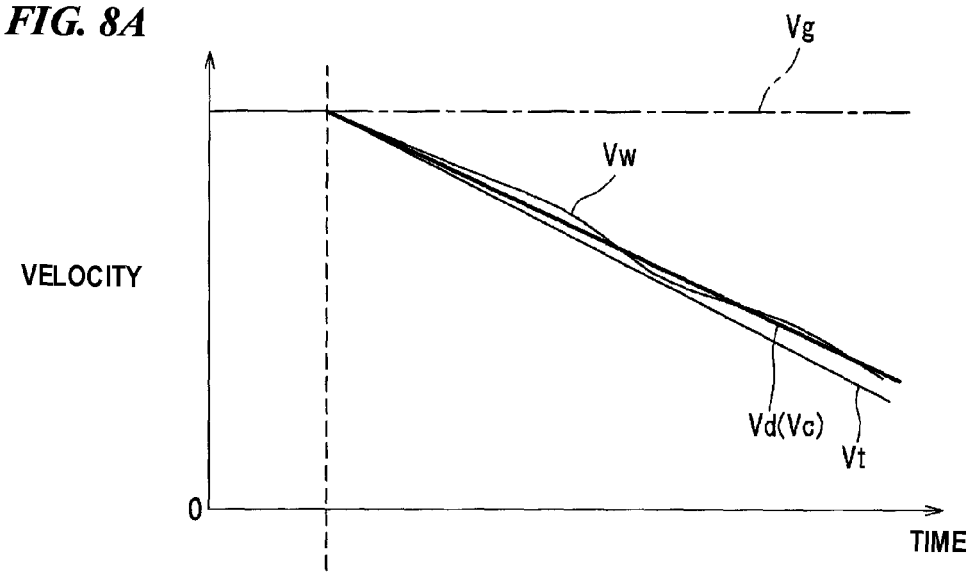
FIGS. 8A to 8C shows time charts which show changes in parameters when the longitudinal acceleration sensor falls in the off fixing in the same road surface conditions and brake conditions as those shown in FIGS. 6A to 6C.
Figure 8B:
Figure 8C:
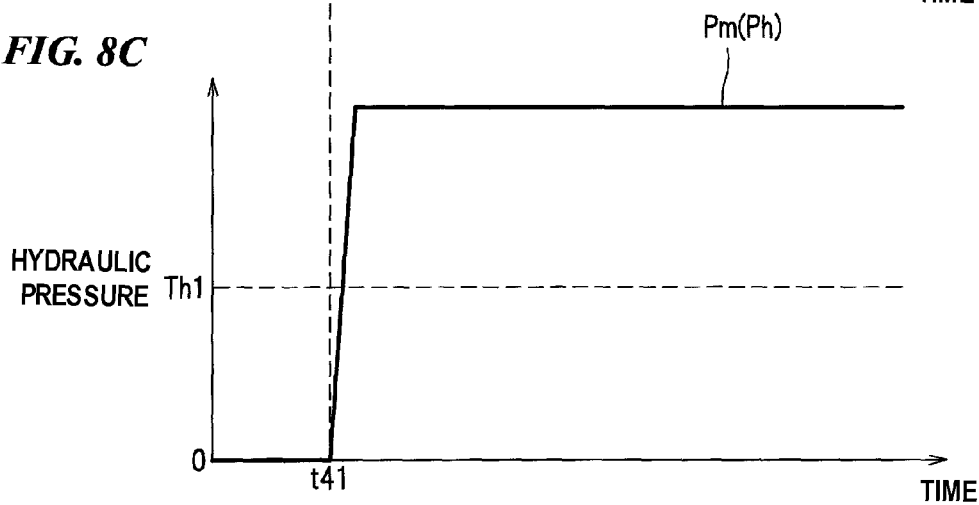

As shown in FIG. 8A, in such a situation in which the longitudinal acceleration sensor 30 falls in the off fixing, when the driver depresses the brake pedal BP (refer to FIGS. 8B and 8C) in the same way and under the same road surface conditions as those in the case described in FIGS. 6A to 6C (time t41), since the master cylinder pressure Pm is larger than the first threshold Th1 as with the case described in FIGS. 6A to 6C, the control unit 20 sets the larger value α2 as the first correction amount α to thereby calculate a temporary vehicle velocity Vd based on the dry road surface deceleration −Ad. Namely, the control unit 20 selects the temporary vehicle velocity Vd which is calculated by using the dry road surface deceleration −Ad rather than the temporary vehicle velocity Vt which is calculated by using the temporary vehicle deceleration −At as the vehicle velocity Vc which is used to calculate a slip amount.

This makes it difficult to determine that there is a locking tendency or there will be occurring an incipient wheel lock in the wheels when the driver attempts to stop the vehicle on a high-μ road with the longitudinal acceleration sensor 30 falling in the off fixing, and therefore, it is possible to suppress the erroneous interference of the ABS control.

Thus, according to the embodiment, in addition to the advantages described above, the following advantages can be obtained. By calculating a second correction value β by adding a value resulting from multiplying the acceleration sensor value by a predetermined ratio and a pre-set fixed value together, the second correction value β can be small in such a situation that a cascade locking is likely to occur (when the acceleration sensor value is small). This makes the offset amount to the deceleration side in relation to the acceleration sensor value so small that the temporary deceleration −At approaches the acceleration sensor value, whereby it is easy to determine that there will be occurring an incipient wheel lock in the wheels W in such a situation that a cascade locking is likely to occur, thereby making it possible to suppress the occurrence of a cascade locking.

When the absolute value of the temporary vehicle deceleration −At which is calculated based on the acceleration sensor value is larger than the absolute value of the dry road surface deceleration −Ad, the dry road surface deceleration −Ad is made use of as the vehicle deceleration −Ac, and therefore, it is possible to determine well that there will be occurring an incipient wheel lock in the wheels on a dry road surface.

Second Embodiment

Next, referring to the drawings as required, a second embodiment of the invention will be described in detail. This embodiment is such that the construction of the control unit 20 according to the first embodiment that has been described above is partially altered. Therefore, like reference numerals will be given to like constituent elements to those of the first embodiment, and the description thereof will be omitted here.

Figure 9:
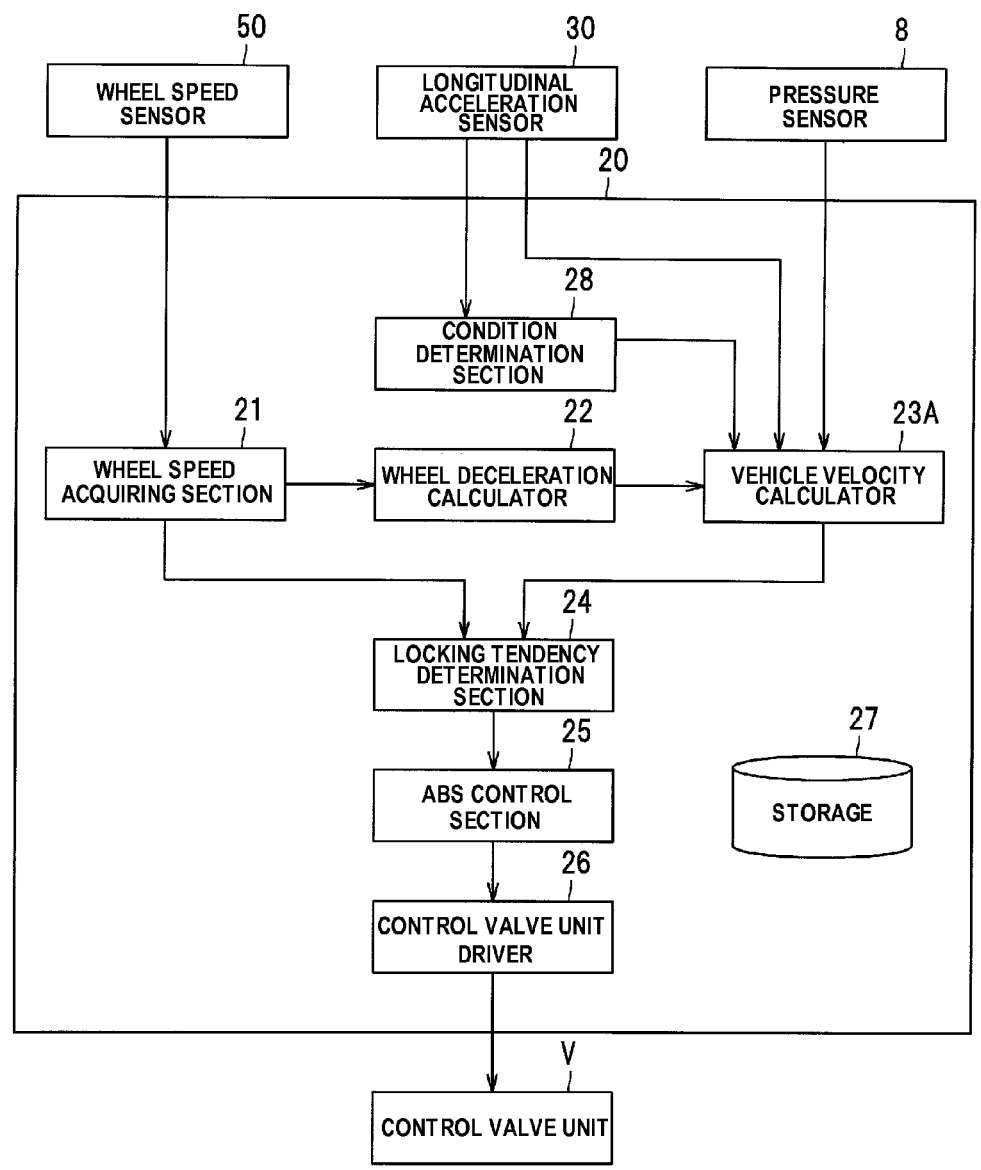
FIG. 9 is a block diagram showing the configuration of a control unit according to a second embodiment.

As shown in FIG. 9, a control unit 20 has a condition determination section 28 which is new to this embodiment and which did not exist in the first embodiment, as well as a vehicle velocity calculator 23A which functions slightly different from the vehicle velocity calculator 23A in the first embodiment.

The condition determination section 28 has a function to determine whether or not a first condition that a difference between an acceleration sensor value and wheel decelerations is equal to or smaller than a predetermined value and a second condition that the first condition continues over a predetermined period of time or longer are met while the vehicle is being accelerated or decelerated. Whether the vehicle is being accelerated or decelerated can be determined based on, for example, the acceleration sensor value.

Specifically speaking, when the difference is equal to or smaller than the predetermined value while the vehicle is being accelerated, the condition determination section 28 decrements an acceleration timer, while when the difference is equal to or smaller than the predetermined value while the vehicle is being decelerated, the condition determination section 28 decrements a deceleration timer. When both the acceleration timer and the deceleration timer reach 0, the condition determination section 28 determines that an output value from a longitudinal acceleration sensor 30 may be used and sets a use permission flag to 1 from 0. The condition determination section 28 resets the use permission flag back to 0 when the driver stops the vehicle.

The acceleration timer is set to two different times of a first time T1 and a second time T2 which is shorter than the first time T1. Specifically speaking, when an ignition switch is switched on, the condition determination section 28 firstly sets the acceleration timer to the first time T1. Thereafter, when the use permission flag is reset back to 0 from 1, the condition determination section 28 sets the acceleration timer to the second time T2.

Similarly, the deceleration timer is set to two different times of a third time T3 and a fourth time T4 which is shorter than the third time T3. Specifically speaking, when the ignition switch is switched on, the condition determination section 28 firstly sets the deceleration timer to the third time T3. Thereafter, when the use permission flag is reset back to 0 from 1, the condition determination section 28 sets the deceleration timer to the fourth time T4.

Hereinbelow, an example of a determination method of the condition determination section 28 will be described by reference to FIGS. 10A to 10E. When the ignition switch (IG) is switched on as shown in FIG. 10A, the condition determination section 28 sets the acceleration timer to the first time T1 and sets the deceleration timer to the third tome T3 as shown in FIGS. 10C and 10D. Thereafter, when the vehicle is accelerated as shown in FIG. 10B, in the event that the difference between the acceleration sensor value and the wheel decelerations is equal to or smaller than the predetermined value, the condition determination section 28 decrements the acceleration time (time t32) as shown in FIG. 10C. When the acceleration timer reaches 0 (time t33), the condition determination section 28 keeps the acceleration time staying at 0.

Thereafter, when the vehicle is decelerated as shown in FIG. 10B, in the event that the difference between the acceleration sensor value and the wheel decelerations is equal to or smaller than the predetermined value, the condition determination section 28 decrements the deceleration time (time t34) as shown in FIG. 10D. When the deceleration timer reaches 0 (time t35), the condition determination section 28 sets the use permission flag to 1 from 0 as shown in FIG. 10E.

Thereafter, when the driver stops the vehicle (time t36) as shown in FIG. 10B, the condition determination section 28 resets the use permission flag back to 0, sets the acceleration timer to the second time T2 which is shorter than the first time T1 and sets the deceleration timer to the fourth time T4 which is shorter than the third time T3 as shown in FIGS. 10C to E.

Since a time to be taken in the following determinations can be shortened by doing so (times t37 to t38, times to t39 to t40), the use permission flag can be set to 1 at an early timing while the vehicle is being decelerated, whereby the use permission flag can be made use of in an early stage of a vehicle velocity calculation, which will be described later.

The condition determination section 28 configured in the way described above outputs the use permission flag on which the condition determination section 28 determines at all times to the vehicle velocity calculator 23A as shown in FIG. 9.

The vehicle velocity calculator 23A has the same function as that of the vehicle velocity calculator 23A of the first embodiment, as well as a function to change a first correction amount α based on the results of determinations made by the condition determination section 28. Specifically speaking, when the condition determination section 28 determines that the first condition and the second condition are met, that is, when the use permission flag outputted is 1, the vehicle velocity calculator 23A uses a value set based on the map shown in FIG. 4 as the first correction amount α.

When the condition determination section 28 determines that the first condition and the second condition are not met, that is, when the use permission flag outputted is 0, the vehicle velocity calculator 23A sets the first correction amount α to such a value that the absolute value of a temporary vehicle deceleration −At is larger than the absolute value of a dry road surface deceleration −Ad. In other words, when the use permission flag is 0, the first correction amount α is set to such a large value (hereinafter, also referred to as an abnormal case correction amount) that the dry road surface deceleration −Ad never fails to be selected as a vehicle deceleration −Ac.

Figure 11A:
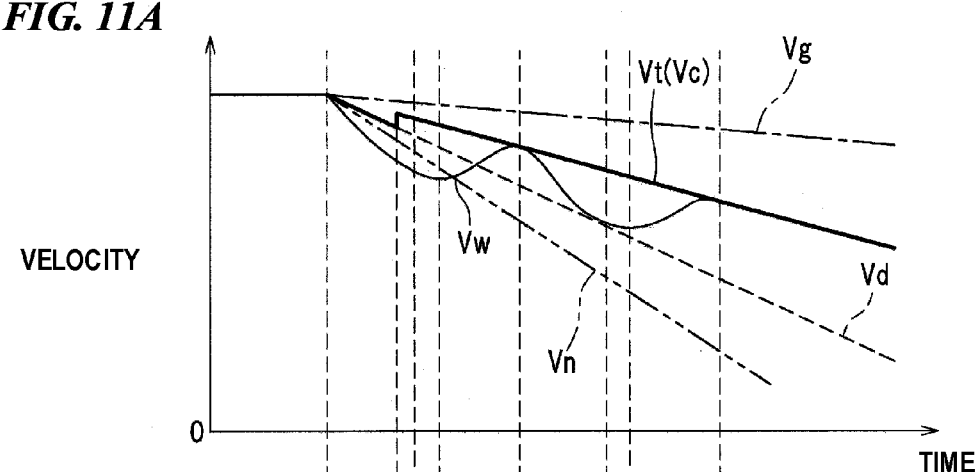
FIGS. 11A to 11D show time charts which show changes in parameters when a use permission flag is set to 1 in the same road surface conditions and brake conditions as those shown in FIGS. 5A to 5C.
Figure 11B:
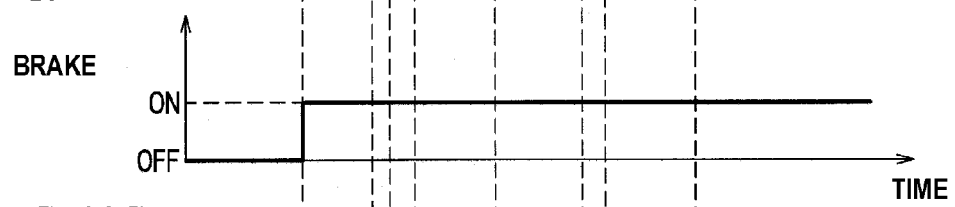

Next, working effects produced by calculating the vehicle velocity Vc by making use of the calculation method according to the second embodiment will be described by reference to FIGS. 11A to 12D. When the driver depresses a brake pedal BP while the driver is driving the vehicle on a low-μ road surface, as shown in FIGS. 11A and 11B, the control unit 20 firstly calculates a vehicle velocity Vc based on wheel speeds in the same way as that in the first embodiment at a point in time when the driver depresses the brake pedal BP (time t61). The control unit 20 executes a use permission determination based on the deceleration time described above when the vehicle is decelerated.

The control unit 20 calculates the temporary vehicle velocity Vd based on the dry road surface deceleration −Ad by setting the first correction amount α to the abnormal case correction amount described above while it is not determined through the use permission determination that the use permission flag is 1 (times t61 to t62). Namely, the control unit 20 selects the temporary vehicle velocity Vd which is calculated by using the dry road surface deceleration −Ad rather than the temporary vehicle velocity Vt which is calculated by using the temporary vehicle deceleration −At as the vehicle velocity Vc which is used to calculate a slip amount.

Figure 11C:
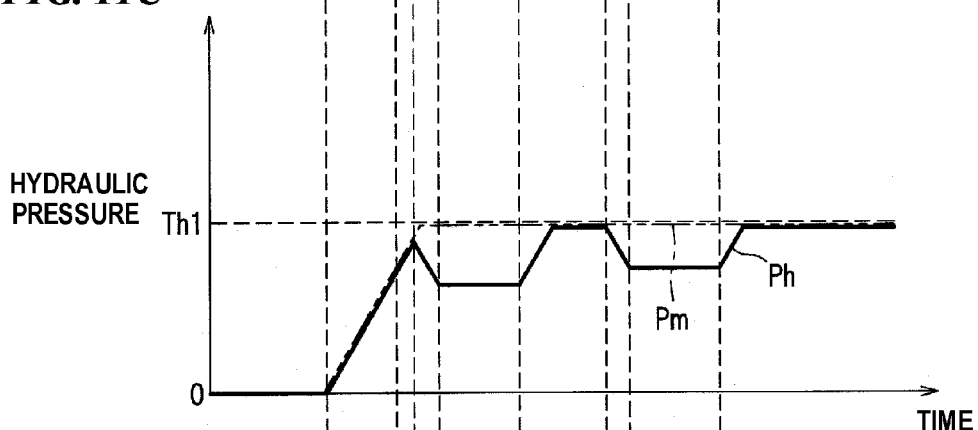
Figure 11D:
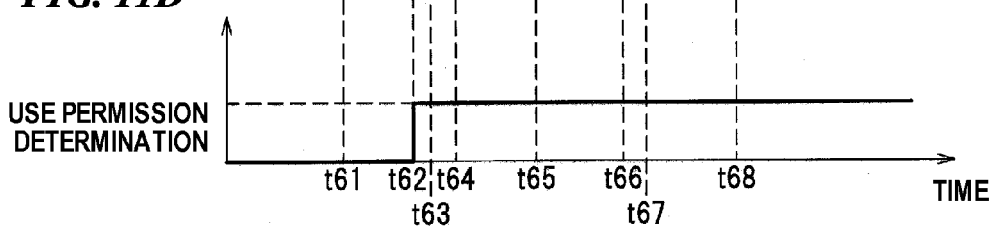

As shown in FIG. 11D, the control unit 20 calculates a vehicle velocity Vc by using the equations (1), (2) described in the first embodiment when it is determined that the use permission flag is 1. (time t62). As this occurs, when the maser cylinder pressure Pm shown in FIG. 11C is equal to or smaller than the first threshold Th1 and wheel decelerations, not shown, are equal to or smaller than the second threshold −Th2, that is, under the circumstances where a cascade locking is likely to occur, the control unit 20 selects the smaller value α1 as the first correction amount α to thereby calculate a temporary vehicle velocity Vt based on the temporary vehicle deceleration −At. Namely, the control unit 20 selects the temporary vehicle velocity Vt which is calculated by using the temporary vehicle deceleration −At rather than the temporary vehicle velocity Vd which is calculated by using the dry road surface deceleration −Ad as the vehicle velocity Vc which is used to calculate a slip amount.

By calculating in the way described above, as with the first embodiment, since it is easy to determine based on the slip amount that there exists a locking tendency or there will be occurring an incipient wheel lock in the wheels W under the circumstances where a cascade locking is likely to occur (time t63), it is possible to suppress the occurrence of a cascade locking. After the ABS control is started (time t63), the control unit 20 executes a hydraulic pressure holding control (time t64), a hydraulic pressure raising control (time t65), a hydraulic pressure reduction control (time t66), the hydraulic pressure holding control (time t67) and the hydraulic pressure raising control (time t68) in the same way as that described before.

Figure 12A:
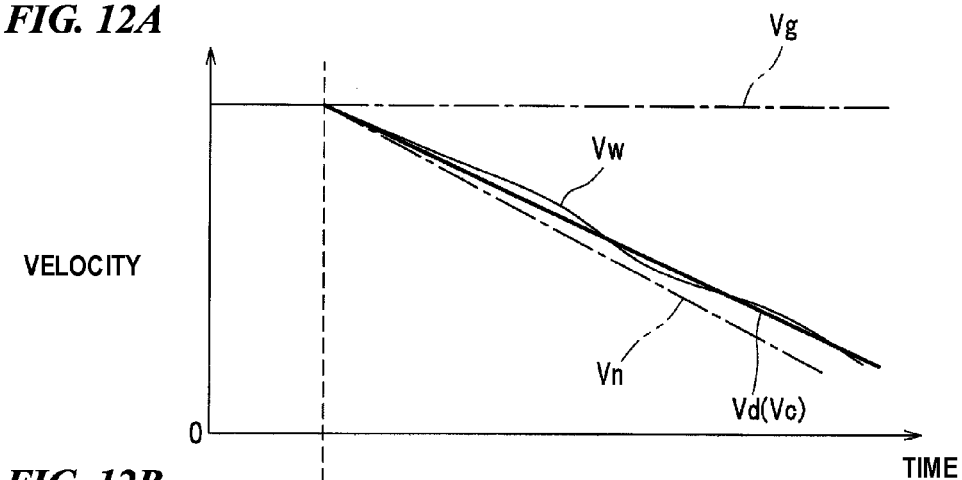
FIGS. 12A to 12D shows time charts which show changes in parameters when the longitudinal acceleration sensor falls in the off fixing in the same road surface conditions and brake conditions as those shown in FIGS. 6A to 6C.
Figure 12B:
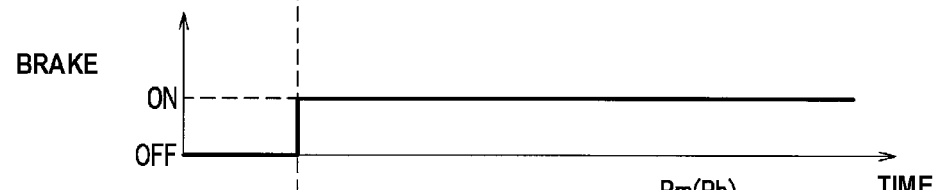
Figure 12C:
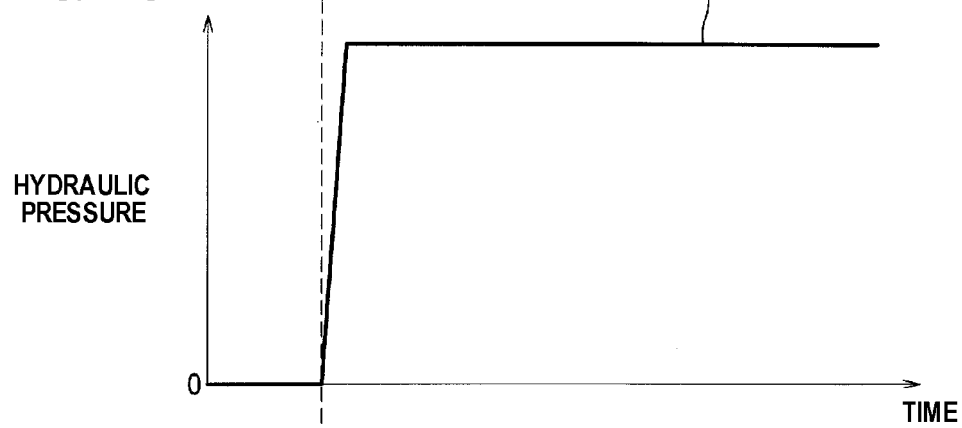
Figure 12D:
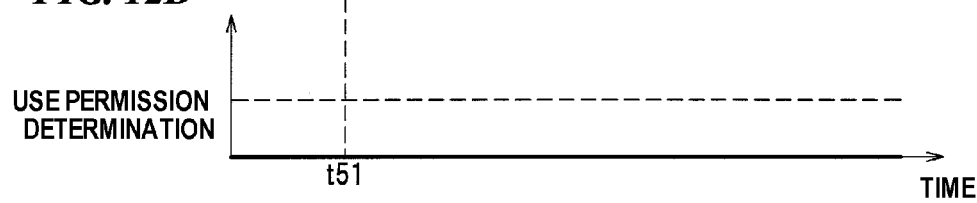

When the driver depresses the brake pedal BP while the driver is driving the vehicle on a dry road surface, the control unit 20 firstly calculate a vehicle velocity Vc based on the wheel speeds in the same way as that used in the first embodiment at the point in time when the driver depresses the brake pedal BP (time t51) as shown in FIGS. 12A to 12C. The control unit 20 executes the use permission determination based on the deceleration timer when the vehicle is decelerated.

The control unit 20 calculates a temporary vehicle velocity Vd based on the dry road surface deceleration −Ad by setting the first correction amount α to the abnormal case deceleration described above while it is not determined through the use permission determination that the use permission flag is 1. Namely, the control unit 20 selects the temporary vehicle velocity Vd which is calculated by using the dry road surface deceleration −Ad rather than the temporary vehicle velocity Vt which is calculated by using the temporary vehicle deceleration −At as the vehicle velocity Vc which his used to calculate a slip amount.

When the vehicle velocity Vg which is calculated based on the acceleration sensor value is fixed to a certain constant value as a result of the longitudinal acceleration sensor 30 falling in the off fixing as shown in FIG. 12A, since it is not determined that the use permission flag is 1 until the vehicle is slowed to a standstill, the control unit 20 calculates a slip amount based on the temporary vehicle velocity Vd which is obtained from the dry road surface deceleration −Ad during that period of time. This can suppress the erroneous interference of the ABS control when the longitudinal acceleration sensor 30 falls in the off fixing.

The invention is not limited to the embodiments that have been described heretofore and can be carried out in the following various forms. While the temporary vehicle deceleration −At is calculated by offsetting the first correction amount α, the second correction amount β and the third correction amount γ to the deceleration side in relation to the acceleration sensor value in the embodiments, the invention is not limited thereto. For example, the temporary vehicle deceleration may be calculated by offsetting only the first correction amount in relation to the acceleration sensor value.

While the master cylinder pressure is described as the example of the brake pedal operation amount in the embodiments, the invention is not limited thereto, and hence, the brake pedal operation amount may be a stroke of the brake pedal which is detected by a stroke sensor, for example.

In the embodiments, while it is described that when the conditions that the brake pedal operation amount (the master cylinder pressure) is equal to or smaller than the first threshold Th1 and the absolute value of the wheel decelerations is equal to or larger than the absolute value of the second threshold −Th2 are met, the first correction amount α is set to the value α1 which is smaller than the value α2 which results when the conditions are not met, the invention is not limited thereto. For example, when a second condition that the brake pedal operation amount is equal to or smaller than a third threshold which is smaller than the first threshold is met in addition to the conditions described above (the first condition), the same value as the value used when the first condition is not met may be set as the first correction amount. α1 may be, for example, 0, provided that α1 is smaller than α2.

While the second correction amount β which corresponds to the output error component of the longitudinal acceleration sensor 30 is described as the variable value which varies according to the acceleration sensor value in the embodiments, the invention is not limited thereto. For example, a positive fixed value may be used as the second correction value.

While the third correction value γ which is set based on the road surface gradient is described as the fixed value in the embodiments, the invention is not limited thereto. For example, when a detection device for detecting a gradient of a road surface is provided, the variable value that varies according to the road surface gradient may be used as the third correction amount.

While either of the temporary vehicle deceleration −At and the dry road surface deceleration −Ad whose absolute value is smaller is used as the vehicle deceleration −Ac in the embodiments, the invention is not limited thereto. For example, the temporary vehicle deceleration may be used as the vehicle deceleration as it is.

While the condition determination section 28 is configured to determine whether or not the first condition and the second condition are met in the embodiments, the invention is not limited thereto. Hence, the condition determination section should be configured to determine at least whether or not the condition that the difference between the acceleration sensor value and the wheel decelerations is equal to or smaller than the predetermined value is met.

The invention claimed is:

1. A vehicle brake hydraulic controller which is mounted in a four-wheel drive vehicle, comprising:
   a wheel speed acquiring section configured to acquire a wheel speed from a wheel speed sensor;
   a wheel deceleration calculator configured to calculate a wheel deceleration based on the wheel speed;
   a vehicle velocity calculator configured to calculate a vehicle deceleration based on a temporary vehicle deceleration which is calculated by using an acceleration sensor value which is outputted from a longitudinal acceleration sensor which detects a longitudinal acceleration to thereby calculate a vehicle velocity based on the vehicle deceleration; and a locking tendency determination section configured to determine from the vehicle velocity and the wheel speed whether or not there exists a locking tendency in a wheel, wherein the vehicle velocity calculator calculates the temporary vehicle deceleration by offsetting a first correction amount to a deceleration side in relation to the acceleration sensor value, and wherein, when conditions that a brake pedal operation amount by a driver is equal to or smaller than a first threshold and that an absolute value of the wheel deceleration is equal to or larger than an absolute value of a second threshold are met, the first correction amount is set to be smaller than when the conditions are not met.

2. The vehicle brake hydraulic controller of claim 1,
wherein the vehicle velocity calculator calculates the temporary vehicle deceleration by offsetting, in addition to the first correction amount, a second correction amount which corresponds to an output error component of the longitudinal acceleration sensor and a third correction amount which is set based on a road surface gradient in relation to the acceleration sensor value.

3. The vehicle brake hydraulic controller of claim 2,
wherein the second correction amount is calculated by using a value which results from multiplying the acceleration sensor value by a predetermined ratio.

4. The vehicle brake hydraulic controller of claim 1,
wherein the vehicle velocity calculator selects either of the temporary vehicle deceleration and a dry road surface deceleration which is set in advance so as to correspond to a dry road surface whose absolute value is smaller as the vehicle deceleration.

5. The vehicle brake hydraulic controller of claim 1, further comprising:

a condition determination section which determines at least whether or not a condition that a difference between the acceleration sensor value and the wheel deceleration is equal to or smaller than a predetermined value is met, wherein, when the condition determination section determines that the condition is met, the vehicle velocity calculator sets the first correction amount based on the brake pedal operation amount and a magnitude of the wheel deceleration, and wherein, when the condition determination section does not determine that the condition is met, the vehicle velocity calculator sets the first correction amount such that an absolute value of the temporary vehicle deceleration is larger than an absolute value of a dry road surface deceleration which corresponds to the dry road surface.

* * * * *